Aug. 8, 1933.  C. F. BOYER  1,921,653
KNUCKLE JOINTED SAFETY MOTOR VEHICLE BUMPER
Filed Feb. 11, 1932
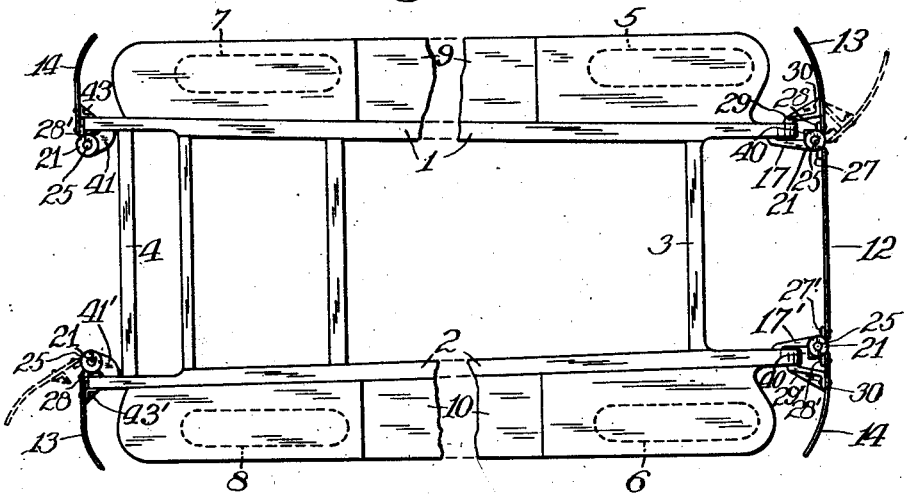
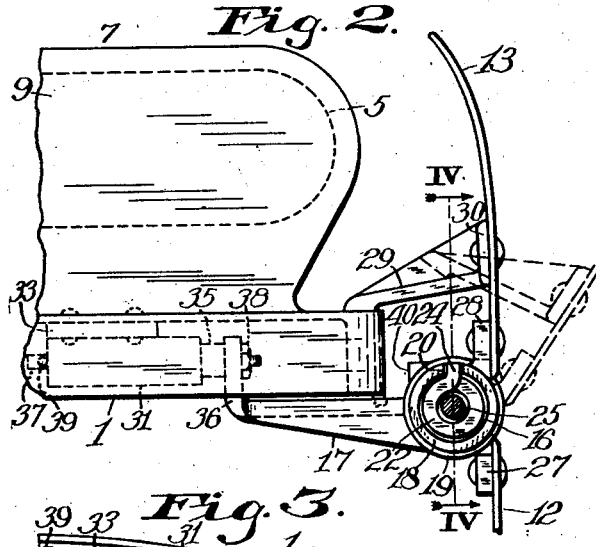
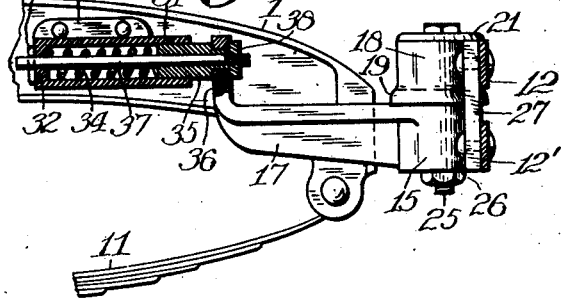
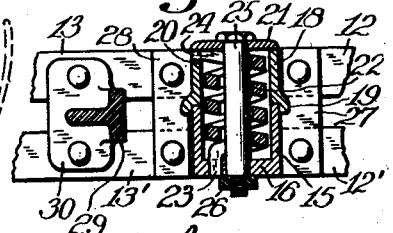
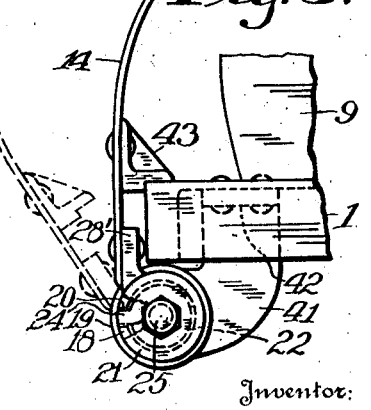
Inventor:
Clarence F. Boyer,
By E. T. Silvius,
Attorney Patented Aug. 8, 1933

1,921,653

UNITED STATES PATENT OFFICE 1,921,653

KNUCKLE-JOINTED SAFETY MOTOR-VEHICLE BUMPER

Clarence F. Boyer, Bloomington, Ill., assignor of one-third to Andrew M. Ryan, Bloomington, Ill.

Application February 11, 1932. Serial No. 592,344

4 Claims. (Cl. 293—55)

This invention relates to a safety bumper or fender guard for motor-vehicles designed to prevent accidents which occur as a result of a passing motor-vehicle becoming hooked to a bumper or fender guard, the invention having reference more particularly to a knuckle-jointed bumper or the like having hinged fender guard portions permitting such portions to be forcibly swung to an abnormal angle away from the motor-vehicle or so as to automatically release the passing motor-vehicle to prevent the dangerous hooking action with which motor-vehicle drivers are familiar.

An object of the invention is to provide means automatically acting to release a motor-vehicle from hooking engagement with the fender portion of a bumper of another motor-vehicle.

Another object is to provide an inexpensive and efficient safety motor-vehicle bumper or fender guard which shall be of such construction as to permit the guard portion of a bumper to be forcibly swung by the impact of a motor-vehicle passing so closely as to not avoid interference with another motor-vehicle that might result in dangerous locking of the two together, during traffic movement with resulting accidental damage to machinery or injury to persons.

A further object is to provide an improved motor-vehicle bumper or fender guard which shall be of such construction as to automatically be returned to normalcy, after having been forcibly bent or turned to prevent hooking occurrence with another motor-vehicle.

A still further object is to provide a knuckle-jointed sectional motor-vehicle bumper that shall be so constructed as to enable a motor-vehicle to be moved closely to a building or other structure without damaging the bumper in the event of being carried into scraping contact with the building, which bumper shall be adapted to be strong and durable and economical in use.

With the above-mentioned and other objects in view, the invention consists in a sectional jointed motor-vehicle bumper in which the guard arms thereof are so hinged to the motor-vehicle that they may be pivotally turned outward from a motor-vehicle and enabled to automatically return to normal arrangement, each guard arm being provided with a novel spring-hinge; the invention consisting also further in the parts and combinations and arrangements of parts as hereinafter particularly described and further defined in the appended claims.

Referring to the accompanying drawing,—Figure 1 is a top plan of an automobile frame to which the invention is applied, the middle portion of the frame being broken away together with the running boards connected therewith; Fig. 2 is a fragmentary top plan showing the improved bumper connected therewith, on an enlarged scale; Fig. 3 is an elevation of Fig. 2 showing a spring-cushion bumper mounting which may be desired; Fig. 4 is a fragmentary section approximately on the line IV—IV on Fig. 2; and Fig. 5 is a fragmentary top plan of a portion of Fig. 1 on an enlarged scale more clearly illustrating one of the rear bumpers or fender guards to be used instead of the front type bumper if desired on a rear end of the motor-vehicle frame.

Similar reference characters in the various figures of the drawing indicate corresponding elements or features of construction herein referred to in detail.

In the drawing the numerals 1 and 2 indicate the side bars of a motor-vehicle frame, 3 and 4 indicating transverse tie bars of the frame, the numerals 5 and 6 indicating the relative positions of the front wheels, and 7 and 8 indicating the relative positions of the rear wheels, the wheels being covered by guards or fenders extending from the running boards 9 and 10 mounted on the frame bars. The frame is conventionally mounted on springs 11.

The improved bumper has three sections 12, 13 and 14, the main or impact section 12 being central and carried in any suitable manner by the frame bars, the others being end sections and constituting guard arms continuing from the main section and curved rearward so as to guard the front wheels, being hingedly supported by the frame bars respectively.

A substantial spring-hinge suitable for the purposes of the invention comprises a hinge barrel 15 having an annular bottom 16, the top of the barrel being open, the barrel having a lateral arm 17 rigid thereon to bodily support it, which may be done in any suitable or desired manner by one of the frame bars. Each barrel comprises also a hinge ring 18 that is arranged to turn upon the top of the barrel wall and has a guide flange 19 thereon encircling the wall. The upper portion of the ring has a pocket or notch 20 therein, the ring supporting a washer 21 on its top that covers a coil spring 22 arranged in the barrel and having a lug device 23 that is fitted into engagement with the barrel bottom. The spring has also a lug arm 24 that is received in the pocket 20. A hinge pin 25 is arranged in the coil spring and the washer and the bottom of the barrel and has a securing nut 26 thereon. The two opposite barrels have wings 27 and 27' respectively that extend upward clear of the ring 18 and to which the main bar 12 of the bumper is rigidly secured, a lower bumper bar 12' being secured also to the wing. The ring 18 has a wing 28 on its outer portion that extends downward clear of the barrel 15, the opposite ring having a wing 28' whereby the bars 13 and 14 are secured to the ring to constitute arm bases, additional arm members 13' if desired being secured to the lower portions of the wings. The hinged guard arms of the bumper have stop fingers 29 and 29' respectively that engage the frame side bars for normally limiting the action of the hinge springs so as to hold the arms in alinement with the main part of the bumper, each finger having a base plate 30 that is secured to the bars 13 and 13' of the guard arm.

For cushioning the bumper when desired each frame bar has a cylinder 31 arranged on its inner side, the cylinder having a bottom 32 and a supporting base plate 33, a coil spring 34 being arranged in the cylinder and seated on its bottom. A plunger 35 is arranged to be guided in the outer portion of the cylinder in contact with the spring and resists thrusts of a projection 36 with which the arm 17 is provided. A rod 37 is arranged in the spring and extends loosely through the bottom of the cylinder and also tightly through the plunger and has a nut 38 securing the plunger to the projection, the opposite end portion of the rod having a key 39 therein at the outside of the cylinder bottom. A stop shoulder 40 is provided on the barrel 15, to be brought into contact with the end of the side bar 1 in case of an excessive thrust against the bumper with corresponding yielding of the cushion spring 34.

In the event that the complete bumper is not desired on the rear end of the motor-vehicle, the safety appliances comprising the guard arms 13 and 14 may be supplied without the main bar 12, in which case the barrels of the spring hinges are provided with suitable arms 41 and 41' respectively, each having a foot member 42 that are secured to the frame side bars respectively, the spring hinges being constructed as above described and supporting the guard arms so as to extend laterally and being provided with bracing stop blocks 43 and 43' respectively that normally engage the frame side bars to enable the arms to resist bumping thrusts while the arms guard the rear ends of the fenders and the rear wheels.

In practical use a motor-vehicle may be driven so close that its rear bumper may catch against the back of the guard arm 13 of the front bumper of another vehicle and pivotally swinging it forward as in Fig. 1 and, readily slipping off from it, may pass on without entailing serious results from the contact, following which the guard arm is automatically swung back by its spring to normal position. Likewise, the rear bumper or fender guard may be caught by a passing motor-vehicle and swung back with ready release, following which the guard arm is swung back by its spring to normal position.

What is claimed is:

1. A motor-vehicle bumper including a cylindrical main part having an arm rigid thereon to support the part and a hinge ring rotatively guided upon and by the main part, a bumper guard arm rigidly secured at one end to the hinge ring, and a coil spring vertically encased in the main part and the ring and anchored at its lower end to the main part and at its upper end to the hinge ring under tension.

2. In a motor-vehicle bumper, the combination of a hinge barrel having a bottom and also a lateral arm to support the barrel, the barrel having an external wing rigid on the outer portion thereof and extending beyond the top portion of the barrel, a bumper bar rigidly secured to said wing, a hinge ring rotatively mounted upon the barrel and having a radial wing thereon and extending downward clear of the barrel, a bumper guard arm rigidly secured to said radial wing, a coil spring arranged in the barrel and the hinge ring and anchored to said bottom and also to the ring, and a stop device to limit the action of said spring.

3. In a motor-vehicle bumper, the combination of an upper main bar and a lower main bar, two hinge barrels arranged at opposite ends respectively of said bars and rigidly secured thereto, each barrel having a lateral arm rigid thereon for support of the barrel, two hinge rings arranged to turn on the barrels respectively and having each a wing integral therewith and extending downward clear of the barrel, two pairs of bumper guard arms rigidly secured to said wings respectively, coil springs mounted in said barrels respectively and anchored thereto, each spring having a lug arm connected to the adjacent hinge ring, and stop devices secured each to a pair of the guard arms to limit the action of the springs respectively.

4. A motor-vehicle bumper including a hinge barrel having a bottom and also a lateral arm to support the barrel, a hinge ring arranged to turn upon the barrel and having a lateral lug thereon, a bumper guard arm secured to said lug, a coil spring arranged in the barrel and having a lug arm anchored to said bottom, the spring extending into the hinge ring and having a lug arm anchored thereto, a hinge pin arranged in said spring and connected to said barrel bottom and having a head washer engaging the top of said ring, and a stop device to limit the action of said spring.

CLARENCE F. BOYER.